(12) United States Patent
Tamaru

(10) Patent No.: US 8,234,567 B2
(45) Date of Patent: *Jul. 31, 2012

(54) DOCUMENT DISPLAY DEVICE, WORD ARRANGEMENT METHOD, AND DOCUMENT DISPLAY METHOD

(75) Inventor: Hisashi Tamaru, Hiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 1141 days.

This patent is subject to a terminal disclaimer.

(21) Appl. No.: 12/104,263

(22) Filed: Apr. 16, 2008

(65) Prior Publication Data

US 2008/0195935 A1    Aug. 14, 2008

Related U.S. Application Data

(63) Continuation of application No. 10/493,817, filed on Apr. 28, 2004, now Pat. No. 7,543,230.

(30) Foreign Application Priority Data

Oct. 29, 2001    (JP) ................................. 2001-330175

(51) Int. Cl.
*G06F 17/21* (2006.01)
(52) U.S. Cl. ........ 715/245; 715/243; 715/244; 715/253; 715/256; 715/258
(58) Field of Classification Search .................... 715/245
See application file for complete search history.

(56) References Cited

U.S. PATENT DOCUMENTS

| | | | |
|---|---|---|---|
| 4,574,363 A | | 3/1986 | Carlgren et al. |
| 4,974,195 A | * | 11/1990 | Amari et al. .................. 715/234 |
| 4,995,738 A | * | 2/1991 | Shibaoka ........................... 400/7 |
| 5,043,936 A | * | 8/1991 | Majima ......................... 715/223 |
| 5,167,017 A | * | 11/1992 | Sasaki ............................ 715/210 |
| 5,193,147 A | * | 3/1993 | Amari et al. .................. 715/234 |
| 5,634,094 A | | 5/1997 | Ueda et al. |
| 6,107,986 A | | 8/2000 | Kennard et al. |

FOREIGN PATENT DOCUMENTS

| | | |
|---|---|---|
| JP | 59-024391 A | 2/1984 |
| JP | 01-111226 A | 4/1989 |
| JP | 1-116758 A | 5/1989 |
| JP | 2-027468 A | 1/1990 |
| JP | 05-135025 A | 6/1993 |
| JP | 05-298317 A | 11/1993 |

OTHER PUBLICATIONS

Donald E. Knuth, et al, "Breaking Paragraphs Into Lines", Sofware-Practice and Experience, vol. 11, pp. 1119 -1184 (1981).

Major Keary, "On Hyphenation—Anarchy of Pedantry" PC Update Online! pp. 1-7. Dec. 1991 Issue of PC Update, the magazine of Melbourne PC User Group, Australia.

* cited by examiner

*Primary Examiner* — Laurie Ries
*Assistant Examiner* — Zaida Marrero
(74) *Attorney, Agent, or Firm* — Birch, Stewart, Kolasch & Birch, LLP

(57) ABSTRACT

A method and device for displaying a document written in a Western language in a readable form without decreasing the utilization efficiency of a display screen. When a tail of a word to be displayed goes beyond an end of a line on the screen and the number of characters contained in the word does not exceeds a reference value, a line feed is inserted immediately before the word to perform word-wrapping, and when the number of characters contained in the word exceeds the reference value, a line feed is inserted halfway within the word to display divided parts of the word on different lines.

15 Claims, 4 Drawing Sheets

DOCUMENT DISPLAY DEVICE, WORD ARRANGEMENT METHOD, AND DOCUMENT DISPLAY METHOD

This application is a Continuation of application Ser. No. 10/493,817 filed on Apr. 28, 2004, now U.S. Pat. No. 7,543,230 and for which priority is claimed under 35 U.S.C. §120; the entire contents of all are hereby incorporated by reference.

TECHNICAL FIELD

The present invention relates to a document display device and a document display method for displaying a document written in a language in which adjoining words are written separated from each other. The present invention finds application, in particular, in cellular phones, portable terminal devices, and the like provided with a display section that can display only a small number of characters per line on the screen thereof.

BACKGROUND ART

Conventionally, on English word processors and personal computers handling documents written in Western languages, when a document is displayed on a screen or printed on paper, word-wrapping is performed whereby, to prevent a word from being cut halfway and arranged on adjoining lines, a new line is started immediately before that word. For example, Japanese Patent Application Laid-Open No. H2-27468 proposes a document creating device wherein character data that represents the characters and symbols entered via a keyboard is temporarily stored in a buffer, and the thus stored character data is sequentially read out from the buffer in such a way that, while word-wrapping is performed on those parts of the character data that happen to be located beyond the previously set display area, the character data is displayed on the screen in a display section.

However, simply performing word-wrapping results in varying blank lengths at the right-hand ends of different lines, making the document appear untidy. To avoid this, justification is often performed in combination whereby extra spaces are inserted between adjoining words to make the left-hand and right hand ends of different lines flush.

The problem here is that, when word-wrapping is performed on a word consisting of a large number of characters and justification is performed on the line preceding that word, this line looks too widely spaced, making the document appear not much better than without such manipulation. To avoid this, hyphenation is further performed in combination whereby a word is divided at a division point between adjoining syllables and arranged on adjoining lines with a hyphen inserted in between.

However, whether to perform hyphenation or not needs to be decided by the operator who is entering the document after tentatively displaying and evaluating the appearance of the document as expected to be obtained when a given word is arranged on adjoining lines. This imposes a heavy burden on the operator.

There have conventionally been proposed also techniques for lessening the burden on the operator before hyphenation. For example, Japanese Patent Application Laid-Open No. H1-116758 proposes a document processing device provided with a line selecting means, a character string moving means, and a division point changing means wherein a document is displayed in a format having hyphens inserted appropriately or in a format close thereto in order to less rely on the operator's operation when deciding whether or not and where to divide given words.

Word-wrapping and hyphenation are, in general, useful to display a document in a readable format. However, quite inconveniently, when applied in cellular phones, portable terminal devices, and the like, i.e., in appliances provided with a display section that can display only a small number of characters per line on the screen thereof, word-wrapping reduces the amount of information that can be presented at a time and hyphenation rather makes a document more difficult to read. This is because, where only a small number of characters can be displayed per line, word-wrapping and hyphenation are performed excessively frequently.

Specifically, frequently performing word-wrapping results in lowering the efficiency with which the display area is used, i.e., the proportion of the area in which characters are actually displayed relative to the whole available display area. This reduces the amount of information that can be presented at a time. Frequently performing hyphenation does not lower the efficiency with which the display area is used, but causes too many words to be divided between adjoining lines. This makes a document difficult to read. Justification helps improve the appearance of a document by leveling out the differences among different lines in the number of characters displayed thereon resulting from word-wrapping, but does not contribute to the improvement of the efficiency with which the display area is used.

DISCLOSURE OF THE INVENTION

An object of the present invention is to provide a document display device, a word arrangement method, and a document display method that permit a document to be displayed in a readable format without unduly lowering display area use efficiency even in a case where only a small number of characters can be displayed per line due to, for example, restrictions on the size of the display area.

To achieve the above object, according to one aspect of the present invention, a document display device including a display section that has a screen on which characters can be displayed in a plurality of lines and a display control section that displays characters while inserting line feeds therein according to the number of characters per line on the screen is provided with: a first judging section that checks whether or not the tail of a word to be displayed goes beyond the end of a line on the screen; a second judging section that, when the first judging section finds the tail of the word to go beyond the end of the line on the screen, checks whether or not the number of characters contained in the word exceeds a reference value; a word-wrap section that, when the first judging section finds the tail of the word to go beyond the end of the line on the screen and in addition the second judging section finds the number of characters contained in the word not to exceed the reference value, instructs the display control section to insert a line feed immediately before the word; and a halfway line-feed section that, when the first judging section finds the tail of the word to go beyond the end of the line on the screen and in addition the second judging section finds the number of characters contained in the word to exceed the reference value, instructs the display control section to insert a line feed halfway within the word.

In this document display device, when the tail of a word goes beyond the end of a line, word-wrapping is performed. Here, however, word-wrapping is performed not unconditionally whenever the tail of a word goes beyond the end of a line but only when the number of characters contained in the word is not greater than the predetermined value, and, when the number of characters contained in the word exceeds the predetermined value, a line feed is inserted halfway within the word. Accordingly, the blank created at the end of a line by word-wrapping always has a length corresponding to a number of characters smaller than the reference value. In this way, it is possible to alleviate the lowering of screen use efficiency, and in addition word-wrapping helps enhance document readability.

Advisably, the number of characters per line on the screen of the display section is made variable, and the document display device is further provided with a setting section that sets, according to the number of characters per line on the screen, the reference value that the second judging section uses to check the number of characters contained in the word. Even though the physical size of the screen of the display section is fixed, the number of characters per line can be changed according to, for example, the area used for the display of a document, whether the document is displayed in a horizontal or vertical format, and the size of the characters displayed. Even when the number of characters per line is changed in this way, by setting the reference value according to the number of characters per line, it is possible to strike an optimal balance between document readability and screen use efficiency.

Here, advisably, the setting section calculates, by multiplying by a predetermined factor the number of characters per line on the screen, the reference value that the second judging section uses to check the number of characters contained in the word.

Alternatively, the document display device is further provided with a judgment table in which are stored, in one-to-one correspondence, different values as the number of characters per line on the screen of the display section and the corresponding values as the reference value that the second judging section uses to check the number of characters contained in the word, and the setting section reads out, from the judgment table, the reference value that the second judging section uses to check the number of characters contained in the word.

According to another aspect of the present invention, a document display device including a display section that has a screen on which characters can be displayed in a plurality of lines and a display control section that displays characters while inserting line feeds therein according to the number of characters per line on the screen is provided with: a first judging section that checks whether or not the tail of a word to be displayed goes beyond the end of a line on the screen; a second judging section that, when the first judging section finds the tail of the word to go beyond the end of the line on the screen, checks whether or not the head of the word is located closer to the end of the line on the screen than a reference position is; a word-wrap section that, when the first judging section finds the tail of the word to go beyond the end of the line on the screen and in addition the second judging section finds the head of the word to be located closer to the end of the line on the screen than the reference position is, instructs the display control section to insert a line feed immediately before the word; and a halfway line-feed section that, when the first judging section finds the tail of the word to go beyond the end of the line on the screen and in addition the second judging section finds the head of the word not to be located closer to the end of the line on the screen than the reference position is, instructs the display control section to insert a line feed halfway within the word.

In this document display device, when the tail of a word goes beyond the end of a line, word-wrapping is performed. Here, however, word-wrapping is performed only when the head of the word is located closer to the end of the line than the reference position is, and, when the head of the word is located just at the reference position or closer to the top of the line than the reference position is, a line feed is inserted halfway within the word. Accordingly, the blank created at the end of a line by word-wrapping is always located only on the end-of-line side of the reference position. In this way, it is possible to alleviate the lowering of screen use efficiency, and in addition word-wrapping helps enhance document readability.

Advisably, the number of characters per line on the screen of the display section is made variable, and the document display device is further provided with a setting section that sets, according to the number of characters per line on the screen, the reference position that the second judging section uses to check where the head of the word is located. Even when the number of characters per line is changed, by setting the reference position according to the number of characters per line, it is possible to strike an optimal balance between document readability and screen use efficiency.

Here, advisably, the setting section calculates, by multiplying by a predetermined factor the number of characters per line on the screen, the reference position that the second judging section uses to check where the head of the word is located.

Alternatively, the document display device is further provided with a judgment table in which are stored, in one-to-one correspondence, different values as the number of characters per line on the screen of the display section and the corresponding positions as the reference position that the second judging section uses to check where the head of the word is located, and the setting section reads out, from the judgment table, the reference position that the second judging section uses to check where the head of the word is located.

According to another aspect of the present invention, a document display device including a display section that has a screen on which characters can be displayed in a plurality of lines and a display control section that displays characters while inserting line feeds therein according to the number of characters per line on the screen is provided with: a first judging section that checks whether or not the tail of a word to be displayed goes beyond the end of a line on the screen; a second judging section that, when the first judging section finds the tail of the word to go beyond the end of the line on the screen, checks whether or not the ratio of the number of characters from the head of the word to the end of the line to the number of characters contained in the word exceeds a reference value; a word-wrap section that, when the first judging section finds the tail of the word to go beyond the end of the line on the screen and in addition the second judging section finds the ratio of the number of characters from the head of the word to the end of the line to the number of characters contained in the word not to exceed the reference value, instructs the display control section to insert a line feed immediately before the word; and a halfway line-feed section that, when the first judging section finds the tail of the word to go beyond the end of the line on the screen and in addition the second judging section finds the ratio of the number of characters from the head of the word to the end of the line to the number of characters contained in the word to exceed the reference value, instructs the display control section to insert a line feed halfway within the word.

In this document display device, when the tail of a word goes beyond the end of a line, word-wrapping is performed. Here, however, word-wrapping is performed only when the ratio of the number of characters from the head of the word to the end of the line to the number of characters contained in the word does not exceed the reference value, and, when the ratio of the number of characters from the head of the word to the end of the line to the number of characters contained in the word exceeds the reference value, a line feed is inserted halfway within the word. Accordingly, the blank created at the end of a line by word-wrapping is always shorter than or equal to the length corresponding to the number of characters obtained by multiplying the number of characters contained in the word as a whole by the predetermined value. This makes it possible to shorten the blank except when the line contains a word containing an especially large number of characters. In this way, it is possible to alleviate the lowering of screen use efficiency, and in addition word-wrapping helps enhance document readability.

Advisably, the reference value that the second judging section uses to check the ratio of the number of characters from the head of the word to the end of the line to the number of characters contained in the word is made variable, and the document display device is further provided with a setting section that sets the reference value according to the number of characters from the head of the word to the end of the line. If the reference value is fixed, the maximum value of the length of the blank created by word-wrapping varies with the number of characters contained in the word. By contrast, by making the reference value variable and determining it according to the number of characters contained in the word, it is possible to make substantially fixed the maximum value of the length of the blank. This helps further alleviate the lowering of screen use efficiency. To achieve this, the reference value is made smaller for words containing larger numbers of characters than for words containing smaller numbers of characters.

Here, advisably, the document display device is further provided with a judgment table in which are stored, in one-to-one correspondence, different values as the number of characters contained in the word and the corresponding values as the reference value that the second judging section uses to check the ratio of the number of characters from the head of the word to the end of the line to the number of characters contained in the word, and the setting section reads out, from the judgment table, the reference value that the second judging section uses to check the ratio of the number of characters from the head of the word to the end of the line to the number of characters contained in the word to.

Advisably, when the first judging section finds the tail of the word to go beyond the end of the line on the screen, the second judging section also checks whether or not the number of characters contained in the word exceeds a reference value, and, even when the first judging section finds the tail of the word to go beyond the end of the line on the screen and in addition the second judging section finds the ratio of the number of characters from the head of the word to the end of the line to the number of characters contained in the word to exceed the reference value, if the second judging section finds the number of characters contained in the word not to exceed the reference value, the halfway line-feed section does not instruct the display control section to insert a line feed halfway within the word but the word-wrap section instructs the display control section to insert a line feed immediately before the word. Consequently, the blank created at the end of a line by word-wrapping is always shorter than or equal to the length corresponding to the reference value for the number of characters contained in the word. This helps further alleviate the lowering of screen use efficiency. Moreover, it no longer occurs that a line feed inserted halfway within a word containing a small number of characters causes a divided part thereof, containing too small a number of characters, to be arranged separately at the end or head of a line. This helps achieve readable display.

Alternatively, when the first judging section finds the tail of the word to go beyond the end of the line on the screen, the second judging section also checks whether or not the head of the word is located closer to the end of the line on the screen than a reference position is, and, even when the first judging section finds the tail of the word to go beyond the end of the line on the screen and in addition the second judging section finds the ratio of the number of characters from the head of the word to the end of the line to the number of characters contained in the word to exceed the reference value, if the second judging section finds the head of the word to be located closer to the end of the line on the screen than the reference position is, the halfway line-feed section does not instruct the display control section to insert a line feed halfway within the word but the word-wrap section instructs the display control section to insert a line feed immediately before the word. Consequently, the blank created at the end of a line by word-wrapping is always located only on the end-of line side of the reference position. This helps further alleviate the lowering of screen use efficiency. Moreover, it no longer occurs that a line feed inserted halfway within a word causes a divided part thereof, containing too small a number of characters, to be arranged separately at the head of a line. This helps achieve readable display.

According to another aspect of the present invention, a word arrangement method for arranging a sequence of words in a line with an upper limit set on the number of characters per line includes the step of: choosing, when the number of characters from the top of a line to the tail of a word exceeds the upper limit of the number of characters per line, whether to arrange only a part or no part at all of the word in the line according to whether or not a predetermined condition is fulfilled.

In this word arrangement method, when a word that is going to be placed last in a line is found to cause the total number of characters in that line to exceed the upper limit, a choice is permitted of whether to include no part at all or only a part of the word in the line. Including no part at all of the word in the line corresponds to word-wrapping, and thus helps enhance document readability. On the other hand, including only a part of the word in the line corresponds to a halfway line feed, and thus helps alleviate the lowering of display area use efficiency. By choosing whether to include no part at all or only a part of a word in a line according to whether a predetermined condition is fulfilled or not, it is possible to strike a desired balance between document readability and display area use efficiency, and thereby it is possible even to enhance both document readability and display area use efficiency.

Here, advisably, the predetermined condition is whether or not the number of characters contained in the word exceeds a reference value, or whether or not the number of characters from the top of the line to the head of the word exceeds a reference value, or whether or not the ratio of the number of characters from the head of the word to the end of the line to the number of characters contained in the word exceeds a predetermined value, Any of these conditions helps simultaneously achieve enhanced document readability and enhanced display area use efficiency. This method can be applied not only to the arrangement of words in each line in a case where a plurality of lines are displayed at a time but also to the arrangement of word in each session of display in a case where only one line is displayed at a time and its display is updated as time passes.

In the present invention, the word arrangement method described above is provided in the form of a software program that is executed on a computer.

According to another aspect of the present invention, a document display method whereby words constituting a document are displayed sequentially with line feeds inserted therein according to the upper limit set on the number of characters per line includes the steps of: setting a reference value for the number of characters contained in a word; inserting a line feed immediately before the word when the number of characters from the top of a line to the tail of the word exceeds the upper limit of the number of characters per line and in addition the number of characters contained in the word does not exceed the reference value; inserting a line feed halfway within the word when the number of characters from the top of the line to the tail of the word exceeds the upper limit of the number of characters per line and in addition the number of characters contained in the word exceeds the reference value.

In this word arrangement method, when the number of characters from the top of a line to the tail of a word exceeds the upper limit of the number of characters per line, a choice is permitted of whether to perform word-wrapping or to insert a halfway line feed. The choice is made according to the number of characters contained in the word in such a way that, when the number of characters contained in the word is not greater than the reference value, word-wrapping is performed and, when number of characters contained in the word exceeds the reference value, a half-way line feed. Consequently, the blank created at the end of a line by word-wrapping always has a length corresponding to the number of characters smaller than the reference value, and this helps alleviate the lowering of display area use efficiency. Moreover, word-wrapping helps enhance document readability. This method can be applied not only in a case where a plurality of lines are displayed at a time but also in a case where only one line is displayed at a time and its display is updated as time passes. Here, "display" denotes not only temporary display as achieved on a liquid crystal display but also continuous or permanent display as achieved by printing on paper.

Advisably, the upper limit of the number of characters per line is made variable, and the reference value for the number of characters contained in the word is set according to the upper limit of the number of characters per line. By making the number of characters per line variable, it is possible to achieve flexible display. For example, on the screen of a device that adopts this method, it is possible to change the area used for the display of a document, and to display the document in whichever of a horizontal and a vertical format is desired; it is also possible to change the size of the characters displayed, Moreover, by setting the reference value according to the number of characters per line, even when the number of characters per line is changed, it is possible to strike an optimal balance between document readability and display area use efficiency.

Here, advisably, the reference value for the number of characters contained in the word is set by multiplying by a predetermined factor the upper limit of the number of characters per line.

Alternatively, different values as the upper limit of the number of characters per line and the corresponding values as the reference value for the number of characters contained in the word are stored in one-to-one correspondence.

According to another aspect of the present invention, a document display method whereby words constituting a document are displayed sequentially with line feeds inserted therein according to the upper limit set on the number of characters per line includes the steps of: setting a reference value for the number of characters from the top of a line to the head of a word; inserting a line feed immediately before the word when the number of characters from the top of the line to the tail of the word exceeds the upper limit of the number of characters per line and in addition the number of characters from the top of the line to the head of the word exceeds the reference value; inserting a line feed halfway within the word when the number of characters from the top of the line to the tail of the word exceeds the upper limit of the number of characters per line and in addition the number of characters from the top of the line to the head of the word does not exceed the reference value.

Also in this document display method, when the number of characters from the top of a line to the tail of a word exceeds the upper limit of the number of characters per line, a choice is permitted of whether to perform word-wrapping or to insert a halfway line feed. Here, the choice is made according to the number of characters from the top of the line to the tail of the word in such a way that, when the number of characters from the top of the line to the tail of the word exceeds the reference value, word-wrapping is performed and, when the number of characters from the top of the line to the tail of the word is not greater than the reference value, a halfway line feed is inserted. The blank created at the end of a line by word-wrapping is always shorter than or equal to the length corresponding to the number of characters equal to the upper limit minus the reference value. This helps alleviate the lowering of display area use efficiency. Moreover, word-wrapping helps enhance document readability. This method also can be applied not only in a case where a plurality of lines are displayed at a time but also in a case where only one line is displayed at a time and its display is updated as time passes. Here, "display" denotes not only temporary display but also continuous or permanent display as achieved by printing.

Advisably, the upper limit of the number of characters per line is variable, and the reference value for the number of characters from the top of the line to the head of the word is set according to the upper limit of the number of characters per line. By making the number of characters per line variable, it is possible to achieve flexible display. Moreover, by setting the reference value according to the number of characters per line, even when the number of characters per line is changed, it is possible to strike an optimal balance between document readability and display area use efficiency.

Here, advisably, the reference value for the number of characters from the top of the line to the head of the word is set by multiplying by a predetermined factor the upper limit of the number of characters per line.

Alternatively, different values as the upper limit of the number of characters per line and corresponding values as the reference value for the number of characters from the top of the line to the head of the word are stored in one-to-one correspondence.

According to another aspect of the present invention, a document display method whereby words constituting a document are displayed sequentially with line feeds inserted therein according to the upper limit set on the number of characters per line, comprising the steps of: subtracting from the upper limit of the number of characters per line the number of characters from the top of a line to immediately before a word to calculate the number of blank characters and then setting a reference value for the ratio of the number of blank characters to the number of characters contained in the word; inserting a line feed immediately before the word when the number of characters from the top of the line to the tail of the word exceeds the upper limit of the number of characters per line and in addition the ratio of the number of blank characters to the number of characters contained in the word does not exceed the reference value; inserting a line feed halfway within the word when the number of characters from the top of the line to the tail of the word exceeds the upper limit of the number of characters per line and in addition the ratio of the number of blank characters to the number of characters contained in the word exceeds the reference value.

Also in this document display method, when the number of characters from the top of a line to the tail of a word exceeds the upper limit of the number of characters per line, a choice is permitted of whether to perform word-wrapping or to insert a halfway line feed. Here, the choice is made according to the ratio of the number of blank characters, which is the value obtained by subtracting from the upper limit of the number of characters per line the number of characters from the top of the line to immediately before the word, to the number of characters contained in the word in such a way that, when the ratio of the number of blank characters to the number of characters contained in the word does not exceed the reference value, word-wrapping is performed and, when the ratio of the number of blank characters to the number of characters contained in the word exceeds the reference value, a halfway line feed is inserted. The blank created at the end of a line by word-wrapping is always shorter than or equal to the length corresponding to the value obtained by multiplying the number of characters contained in the word as a whole by the reference value. This makes it possible to shorten the blank except when the line contains a word containing an especially large number of characters. This helps alleviate the lowering of display area use efficiency. Moreover, word-wrapping helps enhance document readability. This method also can be applied not only in a case where a plurality of lines are displayed at a time but also in a case where only one line is displayed at a time and its display is updated as time passes. Here, "display" denotes not only temporary display but also continuous or permanent display as achieved by printing.

Advisably, the upper limit of the number of characters per line is made variable, and the reference value for the ratio of the number of blank characters to the number of characters contained in the word is set according to the upper limit of the number of characters per line. If the reference value is fixed, the maximum value of the length of the blank created by word-wrapping varies with the number of characters contained in the word. By contrast, by making the reference value variable and determining it according to the number of characters contained in the word, it is possible to make substantially fixed the maximum value of the length of the blank. This helps further alleviate the lowering of screen use efficiency. To achieve this, the reference value is made smaller for words containing larger numbers of characters than for words containing smaller numbers of characters.

Here, advisably, different values as the number of characters contained in the word and corresponding values as the reference value for the ratio of the number of blank characters to the number of characters contained in the word are stored in one-to-one correspondence.

Advisably, a reference value is set also for the number of characters contained in the word, and, even when the number of characters from the top of the line to the tail of the word exceeds the upper limit of the number of characters per line and in addition the ratio of the number of blank characters to the number of characters contained in the word exceeds the reference value, if the number of characters contained in the word does not exceed the reference value, a line feed is inserted immediately before the word. Consequently, the blank created at the end of a line by word-wrapping is always shorter than or equal to the length corresponding to the reference value for the number of characters contained in the word. This helps further alleviate the lowering of screen use efficiency. Moreover, it no longer occurs that a line feed inserted halfway within a word containing a small number of characters causes a divided part thereof, containing too small a number of characters, to be arranged separately at the end or head of a line. This helps further enhance readability.

Alternatively, a reference value is set also for the number of characters from the top of the line to the head of the word, and, even when the number of characters from the top of the line to the tail of the word exceeds the upper limit of the number of characters per line and in addition the ratio of the number of blank characters to the number of characters contained in the word exceeds the reference value, if the number of characters from the top of the line to the head of the word exceeds the reference value, a line feed is inserted immediately before the word. Consequently, the blank created at the end of a line by word-wrapping is always shorter than or equal to the length corresponding to the number of characters equal to the upper limit minus the reference value. This helps further alleviate the lowering of display area use efficiency. Moreover, it no longer occurs that a line feed inserted halfway within a word causes a divided part thereof containing too small a number of characters, to be arranged separately at the head of a line. This helps further enhance readability.

In the present invention, any of the document display methods described above is provided in the form of a software program that is executed on a computer.

BEST MODE FOR CARRYING OUT THE INVENTION

Figure 1:
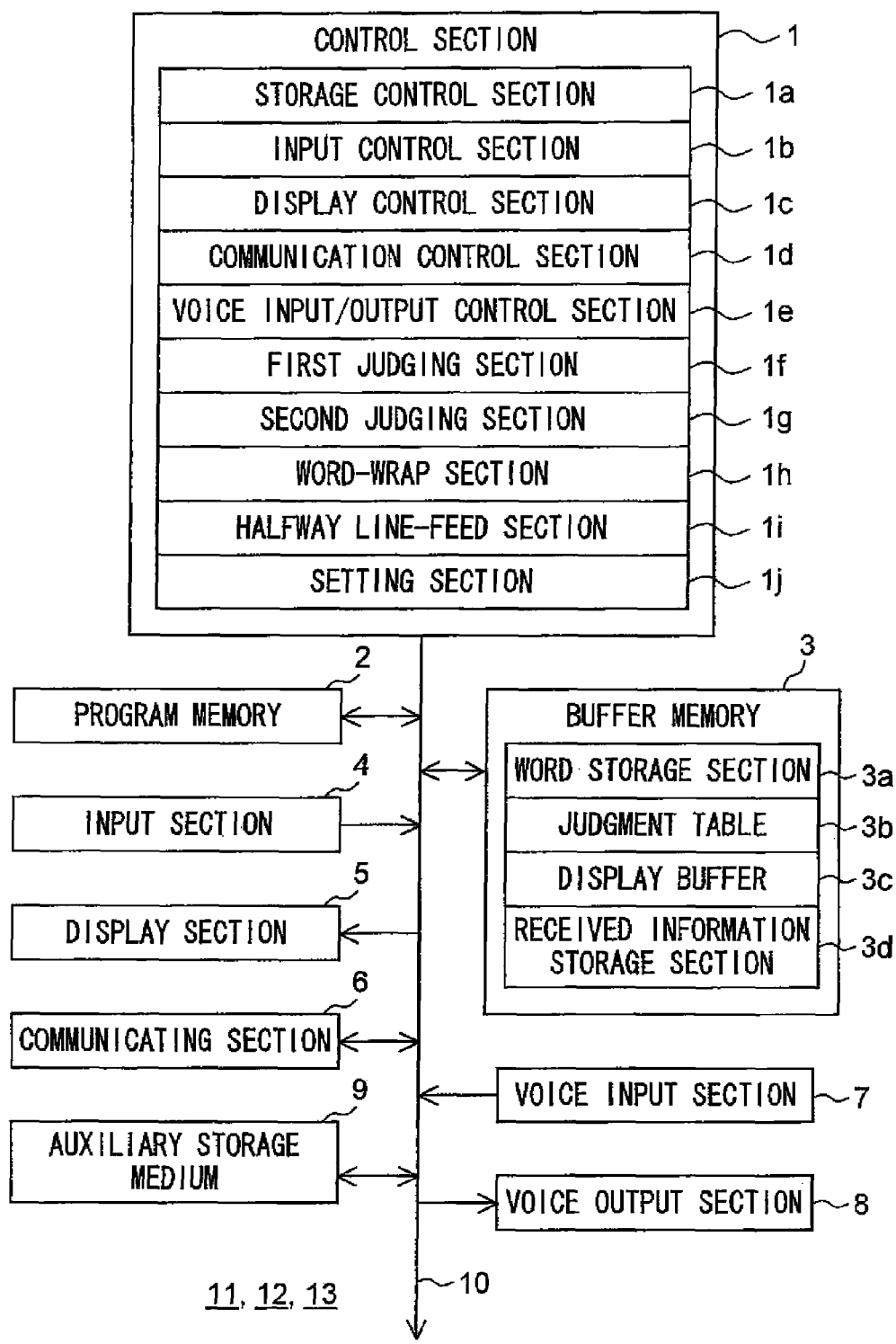
FIG. 1 is a block diagram showing an outline of the configuration of the portable terminal devices of a first, a second, and a third embodiment of the invention.

Hereinafter, embodiments of the present invention will be described with reference to the drawings. FIG. 1 shows an outline of the configuration of the portable terminal device of a first embodiment of the invention. This portable terminal device 11 includes the following functional sections: a control section 1; a program memory 2; a buffer memory 3; an input section 4; a display section 5; a communicating section 6; a voice input section 7; a voice output section 8; an auxiliary storage medium 9; and a bus 10.

The control section 1 is realized, for example, as a CPU or MPU provided in a computer. The control section 1 executes control programs stored in the program memory 2 to control the individual blocks mentioned above by way of the bus 10, and thereby functions as a storage control section 1a, a input control section 1b, a display control section 1c, a communicating control section 1d, and a voice input/output control section 1e. For example, when the control section 1 functions as the display control section 1c, it sequentially reads out the words entered via the input section 4 and stored in the buffer memory 3, and then displays them on the display section 5.

The control section 1 functions further as the following functional sections: a first judging section 1f that checks whether or not the tail of a word displayed on the screen of the display section 5 goes beyond the end of a line (i.e., whether or not the number of characters from the top of the line to the tail of the word exceeds the maximum number of characters per line); a second judging section 1g that checks whether or not the number of characters contained in a word of which the tail goes beyond the end of a line is greater than a previously set reference value; a word-wrap section 1h that inserts a line feed immediately before a word so that the word as a whole is moved to the next line when the first judging section 1f finds the tail of the word to go beyond the end of a line and in addition the second judging section 1g finds the number of characters contained in the word to be smaller than or equal to the reference value; a halfway line-feed section 1i that inserts a line feed halfway within a word and move the tail part thereof to the next line when the first judging section 1f finds the tail of the word to go beyond the end of a line and in addition that the second judging section 1g finds the number of characters contained in the word to be greater than the reference value; and a setting section 1j that sets the reference value that the second judging section 1g uses to check the number of characters.

When the control section 1 functions as the display control section 1c, it can change the maximum number of characters per line by changing the following parameters: the display area on the screen of the control section 1; the direction in which to run lines, i.e., whether to display a document in a horizontal or vertical format; and the size of the characters used. Here, the control section 1 functioning as the setting section 1j calculates, by multiplying by a predetermined factor the maximum number of characters per line, the reference value that the second judging section 1g uses to check the number of characters.

The first judging section 1f and the second judging section 1g are composed of counters, comparator circuits, and other components.

The program memory 2 is realized with a nonvolatile storage medium such as a ROM or EEPROM. In the program memory 2, there are stored control programs and application programs that the program memory 2 uses to control the operation of the portable terminal device 11, and fixed data such as the maximum number of characters that can be displayed per line.

The buffer memory 3 is realized with a volatile storage medium or nonvolatile but rewritable storage medium such as RAM or EEPROM. In the buffer memory 3, there is stored, on a temporary basis, input/output data to and from the individual functional sections that the control section 1 processes to control the cooperation of the portable terminal device 11.

The buffer memory 3 also functions as the following functional sections: a word storage memory 3a in which are sequentially stored words entered via the input section 4; a judgment table 3b in which is stored the reference value that the second judging section 1g uses to check the number of characters; a display buffer 3c in which are stored, on a temporary basis, the word about to be displayed on the screen of the display section 5, the division position, the cursor position, and the like; and a received information storage section 3d in which is stored information received from another terminal device.

As described earlier, the control section 1 functioning as the setting section 1j calculates the reference value by multiplying by a predetermined factor the maximum number of characters that are displayed per line. This calculation is performed beforehand and collectively for each of different values that can be set as the maximum number of characters per line, and the thus calculated reference values are, in one-to-one correspondence with the corresponding values of the maximum number of characters, stored in the judgment table 3b. When the maximum number of characters per line is changed, the reference value corresponding thereto is read out from the judgment table 3b. This eliminates the need to perform calculation every time the number of characters per line is changed, and thus helps achieve fast display.

Instead of calculating the reference value by multiplying by a predetermined factor the maximum number of characters that are displayed per line, it is also possible to predetermine a reference value for each of different values of the maximum number of characters and store the thus calculated reference values in the judgment table. This makes it possible to set more flexibly the ratio of the reference value to the maximum characters per line. In that case, the judgment table is provided not in the buffer memory 3 but in the program memory 2.

The input section 4 includes, for example, numerical keys, key switches, a touch panel, and other components. Under the control of the input control section 1b, the input section 4 accepts entry of words including characters and symbols, commands for connection to another terminal device, commands for transmission/reception of character data, and the like.

The display section 5 is realized with a small-size LCD (liquid crystal display), PD (plasma display), ELD (electroluminescence display), or the like, Under the control of the display control section 1c, the display section 5 displays words constituting a document in a plurality of lines on the screen.

As described earlier, the maximum number of characters that are displayed per line is variable. Specifically, the maximum number per line is, for example, switchable between 16 and 24 characters. In this case, if the predetermined factor is assumed to be ¾, the reference value that the second judging section 1g uses to check the number of characters in a word is switchable between 12 and 18 characters, respectively.

The communicating section 6 is composed of, for example, a modem, a signal modulator/demodulator circuit, and other components. Under the control of the communication control section 1d, the communication control section 1d connects to another terminal device by way of a communication network (not illustrated) to exchange therewith sound signals and character information such as electronic mail.

The voice input section 7 is composed of, for example, a small-size microphone, an A/D converter circuit, and other components. Under the control of the voice input/output control section 1e, the voice input section 7 converts sound information from outside, such as the voice of the operator, into an audio signal.

The voice output section 8 is composed of, for example, a small-size loudspeaker, a D/A converter circuit, and other components. Under the control of the voice input/output control section 1e, the voice output section 8 converts the audio signal received from another terminal device into sound information and then outputs it.

The auxiliary storage medium 9 is realized with a rewritable storage medium such as a RAM or EEPROM, and has a region for storing various programs and various items of information. The auxiliary storage medium 9 is removable from the portable terminal device 11, and is exchangeable. The programs containing the instructions according to which the control section 1 performs various control processes, i.e., the functions of the storage control section 1*a*, input control section 1*b*, display control section 1*c*, communication control section 1*d*, voice input/output control section 1*e*, first judging section 1*f*, second judging section 1*g*, word-wrap section 1*h*, halfway line-feed section 1*i*, and setting section 1*j*, may be stored in the auxiliary storage medium 9 so as to be installed therefrom. In that case, in the program memory 2 is stored only an installation program whereby the programs stored in the auxiliary storage medium 9 are read out therefrom and are stored in the buffer memory 3.

Figure 2:
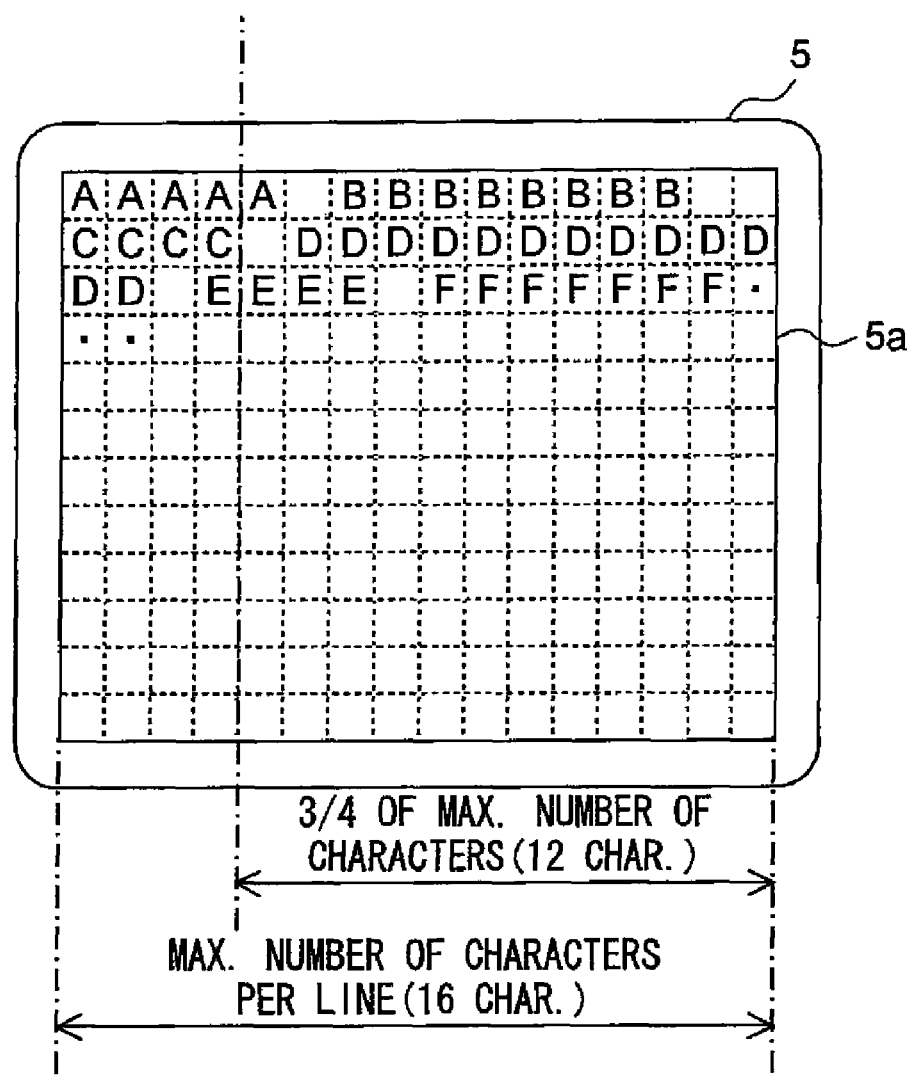
FIG. 2 is a diagram showing an example of how a document is displayed on the portable terminal device of the first embodiment.

FIG. 2 shows an example of how a document is displayed on the screen 5*a* of the display section 5 in the portable terminal device 11. This example deals with a case where the maximum characters per line on the screen 5*a* is 16 and the factor of the reference value relative to the maximum number of characters is ¾, i.e., the reference value is 12. In this example, it is assumed that the following words are displayed in the order mentioned, with a blank corresponding to one character inserted between every two adjoining words: a word "AA . . . A" consisting of five characters, a word "BB . . . B" consisting of eight characters, a word "CCCC" consisting of four characters, a word "DD . . . D" consisting of 13 characters, a word "EEEE" consisting of four characters, and a word "FF . . . F" consisting of seven characters.

With respect to the third word "CCCC," the first judging section 1*f* finds the tail of the word to go beyond the end of a line, and the second judging section 1*g* finds the number of characters contained in the word to be smaller than or equal to the reference value. Thus, the word-wrap section 1*h* inserts a line feed immediately before the word so that the word as a whole is displayed in the next line. With respect to the fourth word "DD . . . D," the first judging section 1*f* finds the tail of the word to go beyond the end of a line, and the second judging section 1*g* finds the number of characters contained in the word to exceed the reference value. Thus, the halfway line-feed section 1*i* inserts a line feed halfway within the word so that divided parts of the word are displayed in different lines. With respect to any of the other words, the first judging section 1*f* finds the tail of the word not to go beyond the end of a line, and therefore the word is displayed in the same line as the one immediately preceding it.

In this way, when the tail of a word goes beyond the end of a line, a choice is made of whether to perform word-wrapping or to insert a halfway line feed according to whether or not the number of characters contained in the word exceeds a reference value. This makes it possible to strike an optimal balance between document readability, which can be enhanced by word-wrapping, and screen use efficiency, of which the lowering can be alleviated by the insertion of line feeds. In this case, the blank created by word-wrapping is always shorter than or equal to the length of the number of characters corresponding to the reference value.

Figure 3:
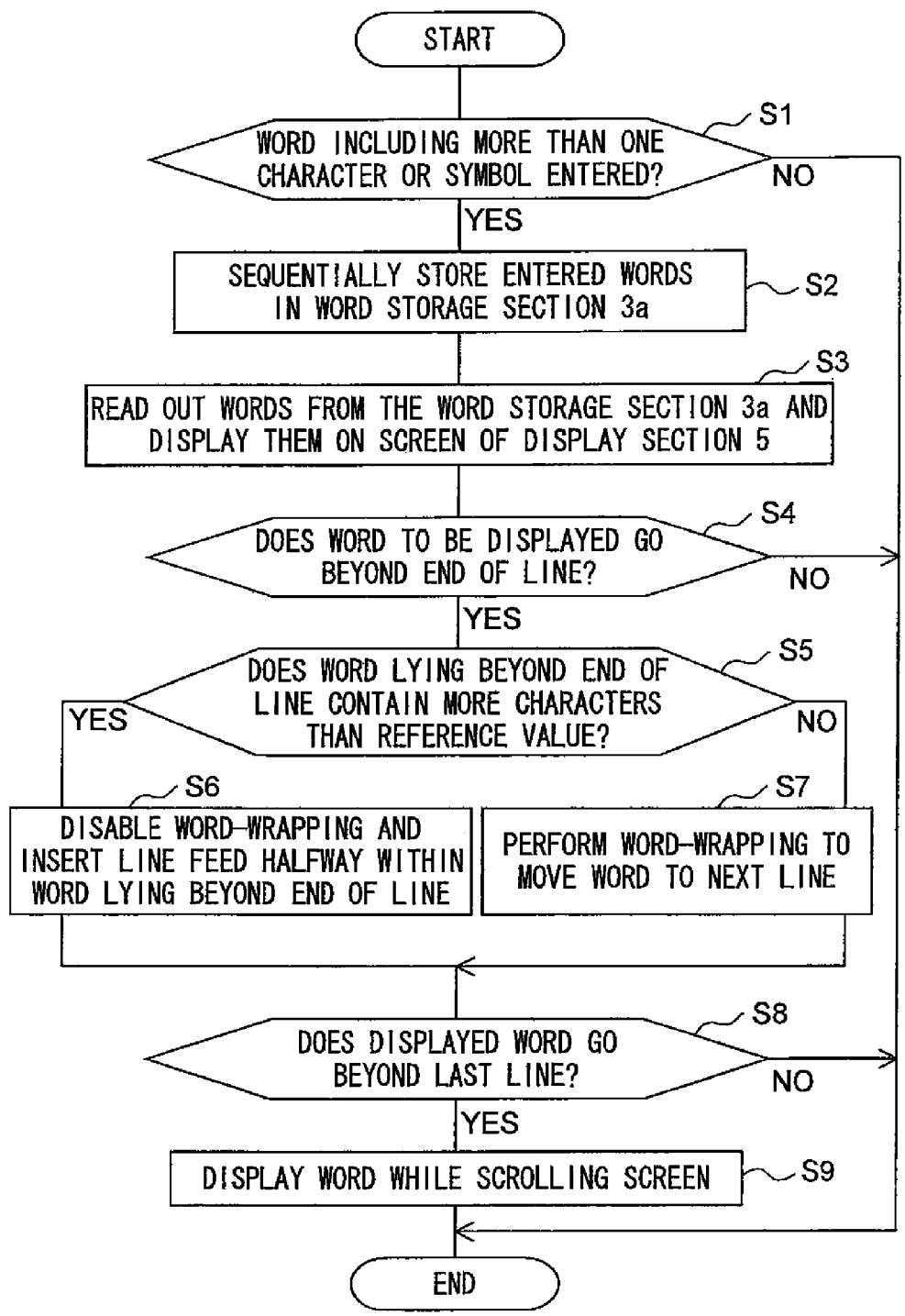
FIG. 3 is a flow chart showing the flow of the operations performed to display a document entered in the portable terminal device of the first embodiment.

By using the method described above, the portable terminal device 11 can display both a document entered via the input section 4 and a document received from another device. FIG. 3 is a flow chart showing the flow of the operations performed to display a document entered via the input section 4. It should be noted that FIG. 3 only shows the process performed on a single word and, to display a document, the process shown in FIG. 3 is performed repeatedly.

First, whether or not a word including more than one character or symbol is entered via the input section 4 is checked (step S1), and, if no word is entered, the process is ended. If a word is entered, the word is stored in the word storage memory 3*a* (S2). Then, the word thus stored is read out from the word storage memory 3*a*, and is displayed on the screen 5*a* of the display section 5.

Next, whether or not the tail of the word to be displayed goes beyond the end of a line is checked (S4), and, if not, the process is ended. If the tail of the word goes beyond the end of the line, whether or not the number of characters contained in the word is greater than the reference value is checked (S5). If the number of characters contained in the word is greater than the reference value, word-wrapping is disabled and a line feed is inserted halfway within the word (S6); if the number of characters contained in the word is smaller than or equal to the reference value, word-wrapping is performed immediately before the word (S7).

Then, whether or not the next line, i.e., when a halfway line feed is inserted, the line in which the remaining part of the word is displayed or, when word-wrapping is performed, the line in which the word as a whole is displayed, exceeds the last line on the screen of the display section 5 (S8), and, if the next line does not exceed the last line, the process is ended. If the next line exceeds the last line, the display on the screen is scrolled up so that the remaining part of the word or the word as a whole is displayed in the last line (S9), and then the process is ended.

Now, the portable terminal device 12 of a second embodiment of the invention will be described. The portable terminal device 12 of this embodiment is a modified version of the portable terminal device 11 of the first embodiment wherein, as compared therewith, modifications are made in the functions of the control section 1 as the second judging section 1*g*, word-wrap section 1*h*, hallway linefeed section 1*i*, and setting section 1*j*. The overall configuration of the portable terminal device 12 is the same as shown in FIG. 1. In the following descriptions, overlapping explanations will be omitted, and only differences from the portable terminal device 11 will be described.

In the portable terminal device 12, when the first judging section 1*f* finds the tail of a word to go over the end of a line, the second judging section 1*g* checks whether or not the number of characters from the top of the line to the head of the word exceeds a reference value, i.e., whether or not the head of the word is located closer to the end of the line than a reference position within the line is.

When the first judging section 1*f* finds the end of the word to go beyond the end of the line and in addition the second judging section 1*g* finds the number of characters from the top of the line to the head of the word to exceed the reference value (i.e., when the head of the word is located closer to the end of the line than the reference position is), the word-wrap section 1*h* inserts a line feed immediately before the word. When the first judging section 1*f* finds the end of the word to go beyond the end of the line and in addition the second judging section 1*g* finds the number of characters from the top of the line to the head of the word to be smaller than or equal to the reference value (i.e., when the head of the word is not located closer to the end of the line than the reference position is), the halfway line-feed section 1*i* inserts a line feed halfway within the word.

The setting section 1*j* sets the reference value (the reference position within a line) that the second judging section 1*g* uses to check the number of characters from the top of the line position) according to the maximum number of characters per line; specifically, it calculates the reference value by multiplying a predetermined factor the maximum number of characters per line, The predetermined factor is, for example, ⅔. In this case, when the maximum number of characters per line is 16, the reference value is 11; when the maximum number of characters per line is 24, the reference value is 16.

The control section 1 functioning as the setting section 1*j* performs, beforehand and collectively for each of different values that can be set as the maximum number of characters per line, the calculation needed to calculate the reference value, and the thus calculated reference values are, in one-to-one correspondence with the corresponding values of the maximum number of characters, stored in the judgment table 3b. When the maximum number of characters per line is changed, the reference value corresponding thereto is read out from the judgment table 3b. As described earlier in connection with the first embodiment, instead of calculating the reference value by multiplying by a predetermined factor the maximum number of characters that are displayed per line, it is also possible to predetermine a reference value for each of different values of the maximum number of characters and store the thus calculated reference values in the judgment table.

Figure 4:
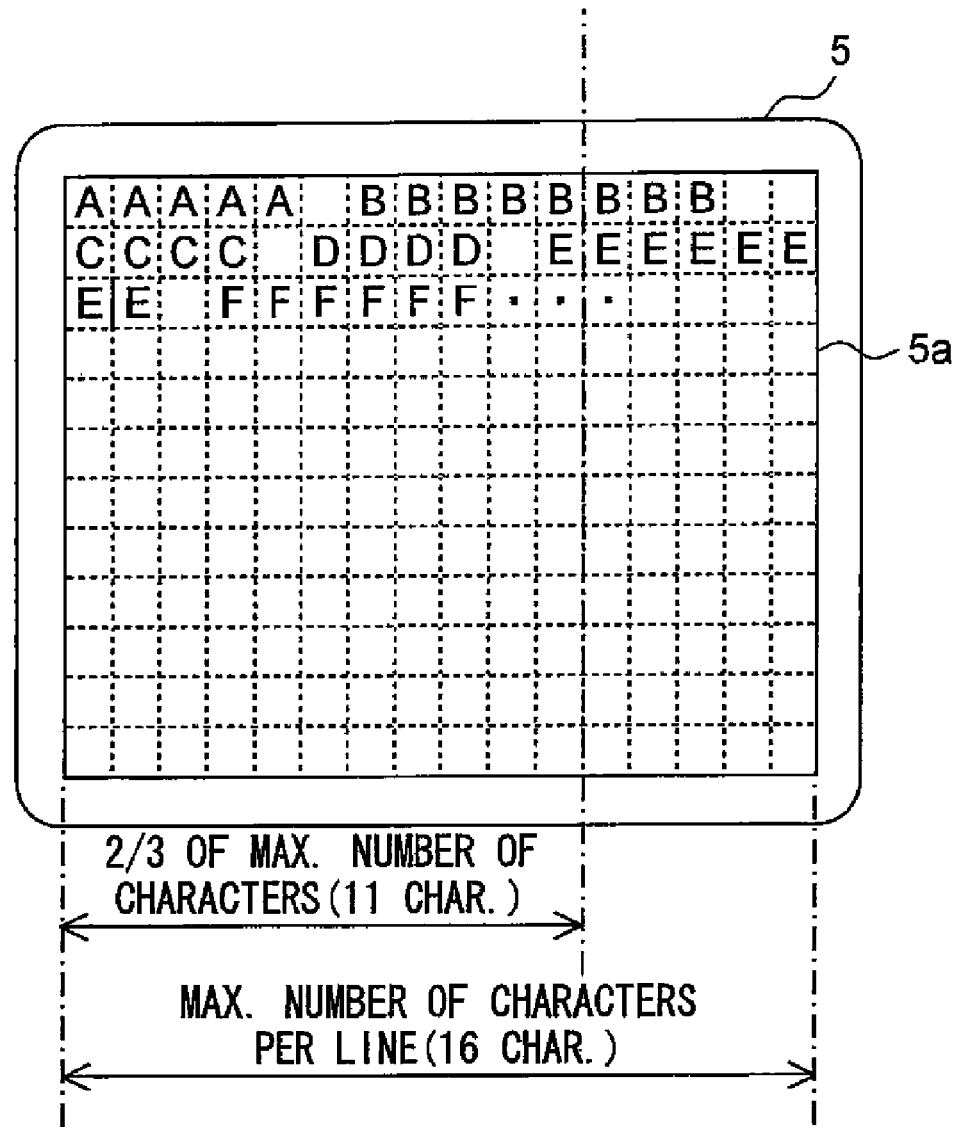
FIG. 4 is a diagram showing an example of how a document is displayed on the portable terminal device of the second embodiment.

FIG. 4 shows an example of how a document is displayed on the screen 5a of the display section 5 in the portable terminal device 12. This example deals with a case where the maximum characters per line on the screen 5a is 16 and the factor of the reference value relative to the maximum number of characters is ⅔, i.e., the reference value is 11. In this example, it is assumed that the following words are displayed in the order mentioned, with a blank corresponding to one character inserted between every two adjoining words: a word "AA . . . A" consisting of five characters, a word "BB . . . B" consisting of seven characters, a word "CCCC" consisting of four characters, a word "DDDD" consisting of four characters, a word "EE . . . E" consisting of eight characters, and a word "FF . . . F" consisting of five characters.

With respect to the third word "CCCC," the first judging section 1f finds the tail of the word to go beyond the end of a line, and the second judging section 1g finds the number of characters from the top of the line to exceed the reference value. Thus, the word-wrap section 1h inserts a line feed immediately before the word so that the word as a whole is displayed in the next line. With respect to the fifth word "EE . . . E," the first judging section if finds the tail of the word to go beyond the end of a line, and the second judging section 1g finds the number of characters from the top of the line to be smaller than or equal to the reference value. Thus, the halfway line-feed section 1i inserts a line feed halfway within the word so that divided parts of the word are displayed in different lines. With respect to any of the other words, the first judging section 1f finds the tail of the word not to go beyond the end of a line, and therefore the word is displayed in the same line as the one immediately preceding it.

In this way, when the tail of a word goes beyond the end of a line, a choice is made of whether to perform word-wrapping or to insert a line feed according to whether or not the number of characters from the top of the line to the head of the word exceeds a reference value. This also makes it possible to strike an optimal balance between document readability, which can be enhanced by word-wrapping, and screen use efficiency, of which the lowering can be alleviated by the insertion of line feeds. In this case, the blank created by word-wrapping is always shorter than or equal to the maximum number of characters per line minus the reference value.

The flow of operations performed to display a document entered via the input section 4 is almost the same as the one shown in FIG. 3. The only difference is that, in step S5, not whether or not the number of characters contained in a word is greater than a predetermined value is checked but whether or not the number of characters from the top of a line to the head of a word is greater than a reference number is checked so that, if so, the flow proceeds to step S7 and, if not, the flow proceeds to step S6.

Now, the portable terminal device 13 of a third embodiment of the invention will be described. The portable terminal device 13 of this embodiment is a modified version of the portable terminal device 11 of the first embodiment wherein, as compared therewith, modifications are made in the functions of the control section 1 as the second judging section 1g, word-wrap section 1h, halfway line-feed section 1i, and setting section 1j. The overall configuration of the portable terminal device 13 is the same as shown in FIG. 1. In the following descriptions, overlapping explanations will be omitted, and only differences from the portable terminal device 11 will be described.

In the portable terminal device 13, when the first judging section 1f finds the tail of a word to go beyond the end of a line, the second judging section 1g checks whether or not the ratio of the number of characters from the head of the word to the end of the line to the number of the characters contained in the word is greater than a reference value. The number of characters from the head of a word to the end of a line is equal to the number of blank characters, i.e., the number obtained by subtracting the number of characters from the top of the line to immediately before the word from the maximum number of characters per line.

When the first judging section 1f finds the end of the word to go beyond the end of the line and in addition the second judging section 1g finds the ratio of the number of characters from the head of the word to the end of the line (the number of blank characters) to the number of the characters contained in the word not to exceed the reference value, the word-wrap section 1h inserts a line feed immediately before the word. When the first judging section 1f finds the end of the word to go beyond the end of the line and in addition the second judging section 1g finds the ratio of the number of characters from the head of the word to the end of the line (the number of blank characters) to the number of the characters contained in the word to exceed the reference value, the halfway line-feed section 1i inserts a line feed halfway within the word.

Accordingly, for example, when the number of characters contained in a word is 10 and the reference value is 0.5, if the number of characters from the head of the word to the end of a line is 4, word-wrapping is performed and, if the number of characters from the head of the word to the end of a line is 7, a halfway line feed is inserted. The number of characters corresponding to the blank created at the end of a line by word-wrapping is smaller than the value obtained by multiplying the number of characters contained in the word by the reference value. This helps alleviate the lowering of screen use efficiency.

The reference value that the second judging section 1g uses to check the ratio between the numbers of characters is variable, and is set by the setting section 1j. Here, the setting section 1j sets the reference value according to the number of characters contained in a word. Specifically, the setting section 1j makes the reference value smaller as the number of characters contained in a word becomes greater. For example, when the number of characters contained in a word is 5, 10, and 15, the reference value is 0.6, 0.5, and 0.4, respectively. The reference value may be kept fixed, but, in that case, the number of characters corresponding to the blank varies in proportion to the number of characters contained in a word. This causes the blank created by word-wrapping to tend to be long when a word contains a large number of characters, and thus diminishes the effect of alleviating the lowering of screen use efficiency. By contrast, by making the reference value smaller as the number of characters contained in a word becomes larger, it is possible to make the blank short even when word-wrapping is performed on a word containing a large number of characters, and thus it is possible to surely obtain the effect of alleviating the lowing of screen use efficiency.

The control section 1 functioning as the setting section 1*j* performs, beforehand and collectively for each of different values that are possible as the number of characters contained in a word, the calculation needed to calculate the reference value, and the thus calculated reference values are, in one-to-one correspondence with the corresponding values of the number of characters contained in a word, stored in the judgment table 3*b*. In the course of actual checking, when the number of characters contained in a word changes, the reference value corresponding thereto is read out from the judgment table 3*b*. As described earlier in connection with the first embodiment, it is also possible to predetermine a reference value for each of different values of the number of characters contained in a word and store the thus calculated reference values in the judgment table.

The flow of operations performed to display a document entered via the input section 4 is almost the same as the one shown in FIG. 3. The only difference is that, in step S5, whether the ratio of the number of characters from the head of a word to the end of a line (the number of blank characters) to the number of the characters contained in the word exceeds a reference value is checked so that, if so, the flow proceeds to step S6 and, if not, the flow proceeds to step S7.

When the ratio of the number of characters from the head of a word to the end of a line (the number of blank characters) to the number of the characters contained in the word exceeds the reference value, a halfway line feed is inserted. The problem here is that, inserting a line feed halfway within a word containing a small number of characters may lower readability. For example, inserting a line feed halfway within a word containing two to four characters causes the head part thereof displayed at the end of the line or the tail part thereof displayed in the next line to contain only one or two characters. This lowers readability and in addition does not effectively alleviate the lowering of screen use efficiency. This inconvenience can be avoided to a certain degree by making the reference value greater as the number of characters contained in a word becomes greater, and can be avoided surely by simultaneously using the method described in connection with the first embodiment.

Specifically, when the first judging section 1*f* finds the tail of a word to go beyond the end of a line, the second judging section 1*g* compares not only the ratio of the number of characters from the head of the word to the end of the line (the number of blank characters) to the number of characters contained in the word with a reference value but also the number of characters contained in the word with a reference value for a word containing that number of characters so that, even when the ratio of the number of blank characters to the number of characters contained in the word exceeds the reference value, if the number of characters contained in the word is smaller than or equal to the reference value, no halfway line feed is inserted, but word-wrapping is inserted. This helps prevent a word containing a small number of characters from being divided, and thus helps achieve satisfactory readability. Moreover, it is also possible to minimize the lowering of screen use efficiency.

Inserting a line feed halfway within a word containing a large number of characters is unlikely to cause the head part thereof displayed at the end of a line to have too small a number of characters. Moreover, since the reference number is made smaller as the number of characters contained in a word becomes larger, it is possible to reduce the blank created by word-wrapping to shorter than or equal to a predetermined length. However, such a hallway line feed may cause the tail part of the word displayed at the top of the next line to have too small a number of characters. Moreover, if reference values are too finely set for different values of the number of characters contained in a word for the purpose of reducing the blank to shorter than or equal to a predetermined length, performing the necessary operations requires a rather complicated process. These inconveniences can be avoided surely by simultaneously using the method described in connection with the first embodiment.

Specifically, when the first judging section 1*f* finds the tail of a word to go beyond the end of a line, the second judging section 1*g* compares not only the ratio of the number of characters from the head of the word to the end of the line (the number of blank characters) to the number of characters contained in the word with a reference value but also the number of characters from the top of the line to the head of the word with a reference value set for that number so that, even when the ratio of the number of blank characters to the number of characters contained in the word exceeds the reference value, if the number of characters from the top of the line to the head of the word exceeds the reference value, no halfway line feed is inserted, but word-wrapping is inserted. This helps secure a number of characters greater than a predetermined number in the tail portion of a word divided by a halfway line feed. Moreover, it is possible, even if reference values for the ratio between the numbers of characters are not set finely, or if the reference value for the ratio between the numbers of characters is kept fixed, it is possible to reduce the blank created by word-wrapping to shorter than or equal to a predetermined length.

In the descriptions of the first to third embodiments given above, specific values are mentioned as the maximum number of characters per line, the reference value for the number of characters contained in a word, the reference value for the number of characters from the top of a line to the head of a word, the ratio of a particular reference value to the maximum number of characters per line, the ratio of the number of blank characters to the number of characters contained in a word, and the like. It should be understood, however, that these values are merely cited as examples, and the aforementioned numbers and ratios may take any other values. The embodiments described above all deal with cases where a document is displayed on the screen of an optical display section on a temporary basis. It should be understood, however, that the present invention is applicable also in cases where a document is displayed on a continuous or permanent basis as by being printed on paper.

INDUSTRIAL APPLICABILITY

The present invention is applicable to document display devices that display a document written in a language in which adjoining words are written separated from each other. The present invention is suitable, in particular, to appliances such as cellular phones and portable terminal devices that are provided with a display section that can display only a small number of characters per line on the screen thereof.

What is claimed is:
1. A word arrangement method for arranging a sequence of words in a line with an upper limit set on a number of characters per line, comprising the steps of:
  subtracting from the upper limit of the number of characters per line a number of characters from a top of a line to immediately before a word to calculate a number of blank characters and then setting a reference value for a ratio of the number of blank characters to a number of characters contained in the word;

inserting a line feed immediately before the word when the number of characters from the top of the line to a tail of the word exceeds the upper limit of the number of characters per line and in addition the ratio of the number of blank characters to the number of characters contained in the word does not exceed the reference value; and inserting a line feed halfway within the word without hyphenation when the number of characters from the top of the line to the tail of the word exceeds the upper limit of the number of characters per line and in addition the ratio of the number of blank characters to the number of characters contained in the word exceeds the reference value.

2. The word arrangement method according to claim 1, wherein the reference value is variable, and wherein the reference value is set according to the number of characters contained in the word.

3. The word arrangement method according to claim 2, wherein different values as the number of characters contained in the word and corresponding values as the reference value are stored in one-to-one correspondence.

4. The word arrangement method according to claim 1, wherein another reference value is set also for the number of characters contained in the word, and wherein, even when the number of characters from the top of the line to the tail of the word exceeds the upper limit of the number of characters per line and in addition the ratio of the number of blank characters to the number of characters contained in the word exceeds the reference value, if the number of characters contained in the word does not exceed said other reference value, a line feed is inserted immediately before the word.

5. The word arrangement method according to claim 1, wherein another reference value is set also for a number of characters from the top of the line to a head of the word, and wherein, even when the number of characters from the top of the line to the tail of the word exceeds the upper limit of the number of characters per line and in addition the ratio of the number of blank characters to the number of characters contained in the word exceeds the reference value, if the number of characters from the top of the line to the head of the word exceeds said other reference value, a line feed is inserted immediately before the word.

6. A word arrangement method for arranging a sequence of words in a line with an upper limit set on a number of characters per line, comprising the steps of:

setting a first reference value for said upper limit;

setting a second reference value for a largest desired number of characters forming a blank leading to an end of a line created when word-wrapping is performed;

determining whether or not a number of characters from a top of the line to a tail of a word exceeds the first reference value;

when it is determined that the number of characters from the top of the line to the tail of the word exceeds the first reference value, determining whether or not a number of characters contained in the word exceeds the second reference value;

inserting a line feed immediately before the word and performing control such that a number of characters forming a blank leading to the end of the line becomes equal to or less than the second reference value when it is determined that the number of characters from the top of the line to the tail of the word exceeds the first reference value and in addition that the number of characters contained in the word does not exceed the second reference value; and inserting a line feed halfway within the word without hyphenation when it is determined that the number of characters from the top of the line to the tail of the word exceeds the first reference value and in addition that the number of characters contained in the word exceeds the second reference value.

7. The word arrangement method according to claim 6, wherein the number of characters per line is variable, and wherein the second reference value is set according to the number of characters per line.

8. The word arrangement method according to claim 7, wherein the second reference value is set by multiplying the number of characters per line by a predetermined factor.

9. The word arrangement method according to claim 7, wherein the second reference value is read out from a table in which different values as the number of characters per line and corresponding values as the second reference value are stored in one-to-one correspondence.

10. A document display method whereby words constituting a document are displayed sequentially with line feeds inserted therein according to an upper limit set on a number of characters per line, comprising the steps of:

setting a first reference value for said upper limit;

setting a second reference value for a largest desired number of characters forming a blank leading to an end of a line created when word-wrapping is performed;

determining whether or not a number of characters from a top of the line to a tail of a word exceed the first reference value;

when it is determined that the number of characters from the top of the line to the tail of the word exceeds the first reference value, determining whether or not a number of characters contained in the word exceeds the second reference value;

inserting a line feed immediately before the word and performing control such that a number of characters forming a blank leading to the end of the line becomes equal to or less than the second reference value when it is determined that the number of characters from the top of the line to the tail of the word exceeds the first reference value and in addition that the number of characters contained in the word does not exceed the second reference value; and inserting a line feed halfway within the word without hyphenation when it is determined that the number of characters from the top of the line to the tail of the word exceeds the first reference value and in addition that the number of characters contained in the word exceeds the second reference value.

11. A word arrangement method for arranging a sequence of words in a line with an upper limit set on a number of characters per line, comprising the steps of:

setting a first reference value for said upper limit;

setting a second reference value for a value obtained by subtracting from the first reference value a largest desired number of characters forming a blank leading to an end of a line created when word-wrapping is performed;

determining whether or not a number of characters from a top of the line to a tail of a word to be displayed exceeds the first reference value;

when it is determined that the number of characters from the top of the line to the tail of the word to be displayed exceeds the first reference value, determining whether or not a number of characters from the top of the line to a head of the word exceeds the second reference value;

inserting a line feed immediately before the word and performing control such that a number of characters forming a blank leading to the end of the line becomes equal to or less than a value obtained by subtracting the second reference value from the first reference value when it is determined that the number of characters from the top of the line to the tail of the word to be displayed exceeds the first reference value and in addition that the number of characters from the top of the line to the head of the word exceeds the second reference value; and inserting a line feed halfway within the word without hyphenation when it is determined that the number of characters from the top of the line to the tail of the word to be displayed exceeds the first reference value and in addition that the number of characters from the top of the line to the head of the word does not exceed the second reference value.

12. The word arrangement method according to claim 11, wherein the number of characters per line is variable, and wherein the second reference value is set according to the number of characters per line.

13. The word arrangement method according to claim 12, wherein the second reference value is set by multiplying the number of characters per line by a predetermined factor.

14. The word arrangement method according to claim 12, wherein the second reference value is read out from a table in which different values as the number of characters per line and corresponding values as the second reference value are stored in one-to-one correspondence.

15. A document display method whereby words constituting a document are displayed sequentially with line feeds inserted therein according to an upper limit set on a number of characters per line, comprising the steps of:

setting a first reference value for said upper limit;

setting a second reference value for a value obtained by subtracting from the first reference value a largest desired number of characters forming a blank leading to an end of a line created when word-wrapping is performed;

determining whether or not a number of characters from a top of the line to a tail of a word to be displayed exceeds the first reference value;

when it is determined that the number of characters from the top of the line to the tail of the word to be displayed exceeds the first reference value, determining whether or not a number of characters from the top of the line to a head of the word exceeds the second reference value;

inserting a line feed immediately before the word and performing control such that a number of characters forming a blank leading to the end of the line becomes equal to or less than a value obtained by subtracting the second reference value from the first reference value when it is determined that the number of characters from the top of the line to the tail of the word to be displayed exceeds the first reference value and in addition that the number of characters from the top of the line to the head of the word exceeds the second reference value; and inserting a line feed halfway within the word without hyphenation when it is determined that the number of characters from the top of the line to the tail of the word to be displayed exceeds the first reference value and in addition that the number of characters from the top of the line to the head of the word does not exceed the second reference value.

* * * * *

UNITED STATES PATENT AND TRADEMARK OFFICE
CERTIFICATE OF CORRECTION

| | |
|---|---|
| PATENT NO. | : 8,234,567 B2 |
| APPLICATION NO. | : 12/104263 |
| DATED | : July 31, 2012 |
| INVENTOR(S) | : Hisashi Tamaru |

It is certified that error appears in the above-identified patent and that said Letters Patent is hereby corrected as shown below:

ON THE TITLE PAGE:

At item (63), correct the Related U.S. Application Data to read as follows:

-- (63) Continuation of application No. 10/493,817, filed as application No. PCT/JP02/11185 on Oct. 28, 2002, now Pat. No. 7,543,230. --

Signed and Sealed this
Sixth Day of November, 2012

David J. Kappos
*Director of the United States Patent and Trademark Office*